US008893080B2

(12) United States Patent
Von Platen et al.

(10) Patent No.: US 8,893,080 B2
(45) Date of Patent: Nov. 18, 2014

(54) PARALLELIZATION OF DATAFLOW ACTORS WITH LOCAL STATE

(75) Inventors: Carl Von Platen, Malmö (SE); Charles Chen Xu, Lund (SE); Song Yuan, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 153 days.

(21) Appl. No.: 13/586,820

(22) Filed: Aug. 15, 2012

(65) Prior Publication Data

US 2014/0053129 A1    Feb. 20, 2014

(51) Int. Cl.
*G06F 9/44*    (2006.01)

(52) U.S. Cl.
USPC ........... 717/106; 717/111; 717/151; 717/153; 717/154; 717/155

(58) Field of Classification Search
None
See application file for complete search history.

(56) References Cited

U.S. PATENT DOCUMENTS

| | | | | |
|---|---|---|---|---|
| 5,920,710 A * | 7/1999 | Tan et al. | | 712/216 |
| 7,761,272 B1 | 7/2010 | Jannek et al. | | |
| 7,788,672 B2 * | 8/2010 | Tanaka | | 718/106 |
| 7,996,827 B2 | 8/2011 | Vorbach et al. | | |
| 8,271,541 B2 * | 9/2012 | Mohan et al. | | 707/803 |
| 2002/0007450 A1 * | 1/2002 | Witt et al. | | 712/23 |
| 2002/0188426 A1 * | 12/2002 | Datta et al. | | 702/186 |
| 2004/0098727 A1 * | 5/2004 | Bjare et al. | | 719/310 |
| 2005/0005262 A1 * | 1/2005 | Mohan et al. | | 717/109 |
| 2005/0097561 A1 | 5/2005 | Schumacher et al. | | |
| 2005/0188364 A1 * | 8/2005 | Cockx et al. | | 717/159 |
| 2006/0005179 A1 * | 1/2006 | Kawahara et al. | | 717/157 |
| 2007/0168992 A1 * | 7/2007 | Bates | | 717/128 |
| 2009/0225082 A1 | 9/2009 | Hargrove et al. | | |
| 2009/0307660 A1 * | 12/2009 | Srinivasan | | 717/114 |
| 2010/0153654 A1 * | 6/2010 | Vorbach et al. | | 711/137 |
| 2010/0185719 A1 * | 7/2010 | Howard | | 709/201 |
| 2010/0268691 A1 * | 10/2010 | Grinstein et al. | | 707/682 |
| 2010/0306733 A1 | 12/2010 | Bordelon et al. | | |
| 2011/0197047 A1 * | 8/2011 | Hiroshi | | 712/29 |

(Continued)

FOREIGN PATENT DOCUMENTS

EP    0 867 820 A2    9/1998

OTHER PUBLICATIONS

Grimshaw, A.S. et al. "Portable Run-Time Support for Dynamic Object-Oriented Parallel Processing" Technical Report No. CS-93-40, Jul. 14, 1993.

(Continued)

*Primary Examiner* — Chameli Das
(74) *Attorney, Agent, or Firm* — Leffler Intellectual Property Law, PLLC; Kenneth B. Leffler

(57) ABSTRACT

Processing a dataflow program by a program development tool includes analyzing an actor defined by the dataflow program to identify original sequences of actions that can be reformulated to achieve greater execution parallelism while maintaining the same functionality as the original sequences. A processed dataflow program is produced comprising processed dataflow program instructions and decision point program instructions. The processed dataflow program instructions comprise alternative sequences of reformulated actions that achieve greater execution parallelism while maintaining the same functionality as the identified one or more original sequences. The decision point program instructions direct processing equipment to select and execute one or more of the alternative sequences of reformulated actions, wherein selection is based on state and token information in existence at the time of selection. When more than one alternative sequence can be selected, selection of sequence with highest parallelism is preferred.

15 Claims, 12 Drawing Sheets

(56) References Cited

U.S. PATENT DOCUMENTS

| | | | |
|---|---|---|---|
| 2011/0283095 A1* | 11/2011 | Hall et al. | 712/228 |
| 2011/0314441 A1 | 12/2011 | Lee et al. | |
| 2012/0079246 A1* | 3/2012 | Breternitz et al. | 712/208 |
| 2012/0144376 A1* | 6/2012 | Van Eijndhoven et al. | 717/146 |
| 2013/0254751 A1* | 9/2013 | Howard | 717/136 |

OTHER PUBLICATIONS

Roquier, G. et al. "Hardware/Software Co-Design of Dataflow Programs for Reconfigurable Hardware and Multi-Core Platforms" 2011 Conference on Design and Architectures for Signal and Image Processing (DASIP), Nov. 2-4, 2011, pp. 1-7.

Delavel, G. et al. "A Type System for the Automatic Distribution of Higher-order Synchronous Dataflow Programs" LCTES'08, Jun. 12-13, 2008, Tuscon, Arizona, USA, 2008 ACM 978-1-60558-104-0/08/06.

Lee, E. A. et al. "Dataflow process networks" in Proceedings of the IEEE, vol. 83, No. 5, pp. 773-801, 1995.

Zima, H. "Supercompilers for Parallel and Vector Computers", ACM Press, NY, USA, 1991, ISBN: 0-201-17560-6 pp. 180-183 (Chapter 5.3.2), pp. 184-186 (Chapter 5.4), pp. 225-229 (Chapter 6.5.2), pp. 229-230 (Chapter 6.5.3) and pp. 235-237 (Chapter 6.5.7).

Wolfe, M. "Beyond induction variables" in Proceedings of ACM SIGPLAN Conference on Programming Language Design and Implementation (PLDI'92), 1992, pp. 162-174.

Bilsen, G. et al. "Cyclo-static dataflow" IEEE Int. Conf. ASSP, pp. 3255-3258 Detroit, Michigan, May 1995.

Aho, A. V. et al. "Compilers, principles, techniques, and tools", Addison Wesley, USA, 1985, ISBN: 0-201-10194-7 pp. 624-633.

Arzen, K-E et al. "Model Compiler", M36 deliverable of EP FP7 STREP Actors, 2011, http://www.actors-project.eu/index/php?page=public-deliverables.

Eker, J. et al. "CAL Language Report: Specification of the CAL actor language" Technical Memorandum No. UCB/ERL M03/48, University of California, Berkeley, CA, 94720, USA, Dec. 1, 2003.

* cited by examiner

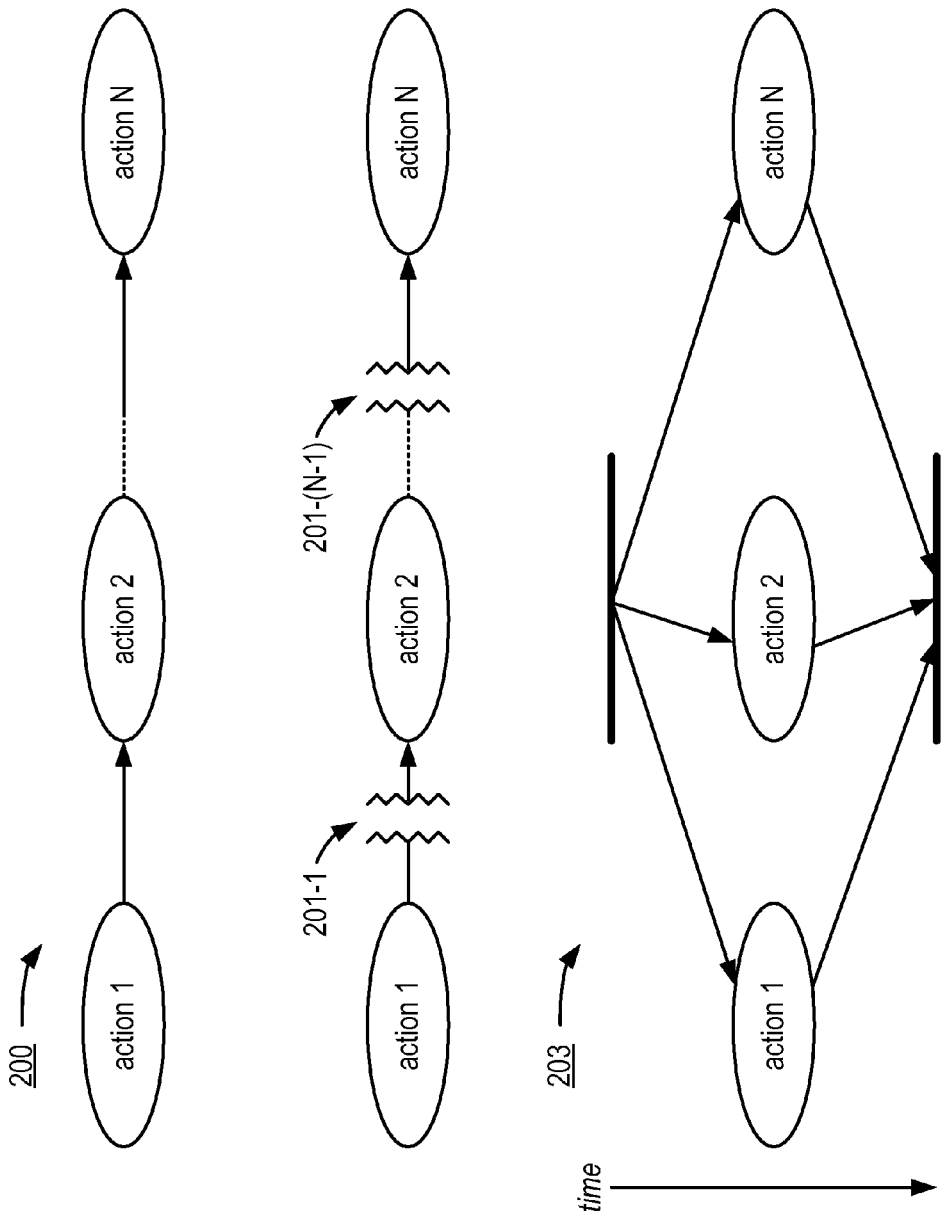

PARALLELIZATION OF DATAFLOW ACTORS WITH LOCAL STATE

BACKGROUND

The present invention relates to dataflow programming environments, and more particularly to processing a dataflow program in a manner that results in a processed (e.g., reformulated) dataflow program having the same functionality but with increased parallelization within individual actors.

Dataflow modeling is emerging as a promising programming paradigm for streaming applications for multicore hardware and parallel platforms in general. This more constrained programming model benefits high-level transformations and facilitates advanced code optimizations and run-time scheduling.

A dataflow program is made up of a number of computational kernels, (called "actors" or "functional units") and connections that specify the flow of data between the actors. An important property of a dataflow program is that the actors only interact by means of the flow of data over the connections: there is no other interaction. In particular, actors do not share state. The absence of shared state makes a dataflow program relatively easy to parallelize: the actors can execute in parallel, with each actor's execution being constrained only by the requirement that all of its inputs be available.

FIG. 1 illustrates an exemplary graphical representation of a dataflow program 100 having seven actors, identified with respective reference numerals A, B, C, D, E, F, and G. The actors A, B, C, D, E, F, and G carry out their functions by means of their code (i.e., program instructions) being executed within a processing environment 101 that comprises one or more programmable processors 103 that retrieve program instructions and data from one or more non-transitory processor readable storage media (e.g., as represented by memory 105). Connections between the actors are indicated by arrows. The dataflow program 100 illustrates that an actor can have one or more input connections, and can have any number of output connections, including none. For example, actor G lacks any output ports, and is consequently commonly referred to as a "sink". A sink does not affect the state of the other actors. In practice, sinks typically represent interaction with the environment in which the dataflow program executes. For example, a sink could represent an actuator, an output device, or the like. A sink could also represent a system that has not yet been implemented, in which case the sink mimics the missing subsystem's demand for input.

Feedback loops can be formed as illustrated in this example by actors C, D, E, and F forming a cycle, and also by actor B having a self-loop. It will be observed that feedback limits parallelism, since an actor's firing (i.e., its execution) may have to await the presence of input data derived from one of its earlier firings.

Communication between actors occurs asynchronously by means of the passing of so-called "tokens", which are messages from one actor to another. These messages can represent any type of information (e.g., numeric, alphabetic, program-defined values, etc.), with the particular type of information in any one case being defined by the dataflow program. As used herein, the term "value" refers to the particular information (as distinguished from the information type or range of possible information instances) represented by a token or instance of an actor state without any limitation regarding whether that value is numeric, alphabetic, or other, and without regard to whether the information is or is not a complex data structure (e.g., a data structure comprising a plurality of members, each having its own associated value).

The dataflow programming model is a natural fit for many traditional Digital Signal Processing (DSP) applications such as, and without limitation, audio and video coding, radio baseband algorithms, cryptography applications, and the like. Dataflow in this manner decouples the program specification from the available level of parallelism in the target hardware since the actual mapping of tasks onto threads, processes and cores is not done in the application code but instead in the compilation and deployment phase.

In a dataflow program, each actor's operation may consist of a number of actions, with each action firing as soon as all of its required input tokens become valid (i.e., are available) and, if one or more output tokens are produced from the actor, there is space available in corresponding output port buffers. Whether the firing of the action occurs as soon as it is instructed to do so or whether it must nonetheless wait for one or more other activities within the actor to conclude will depend on resource usage within the actor. Just as the firing of various actors within a dataflow program may be able to fire concurrently or alternatively may require some sort of sequential firing based on their relative data dependence on one another, the firing of various actions within an actor can either be performed concurrently or may alternatively require that some sequentiality be imposed based on whether the actions in question will be reading or writing the same resource; it is a requirement that only one action be able to read from or write to a resource during any action firing.

An input token that, either alone or in conjunction with others, instigates an action's firing is "consumed" as a result (i.e., it is removed from the incoming connection and ceases to be present at the actor's input port). An actor's actions can also be triggered by one or more state conditions, which include state variables combined with action trigger guard conditions and the action scheduler's finite state machine conditions. Guard conditions may be Boolean expressions that test any persistent state variable of the actor or its input token. (A persistent state variable of an actor may be modeled, or in some cases implemented, as the actor producing a token that it feeds back to one of its input ports. In FIG. 1, the actor B's self-loop can be an example of a persistent state variable of actor B.) One example (from among many) of a dataflow programming language is the CAL language that was developed at UC Berkeley The CAL language is described in "CAL Language Report: Specification of the CAL actor language, Johan Eker and Jörn W. Janneck, Technical Memorandum No. UCB/ERL M03/48, University of California, Berkeley, Calif., 94720, USA, Dec. 1, 2003", which is hereby incorporated herein by reference in its entirety. In CAL, operations are represented by actors that may contain actions that read data from input ports (and thereby consume the data) and that produce data that is supplied to output ports. The CAL dataflow language has been selected as the formalism to be used in the new MPEG/RVC standard ISO/IEC 23001-4 or MPEG-B pt. 4. Similar programming models are also useful for implementing various functional components in mobile telecommunications networks.

Typically, the token passing between actors (and therefore also each connection from an actor output port to an actor input port) is modeled (but not necessarily implemented) as a First-In-First-Out (FIFO) buffer, such that an actor's output port that is sourcing a token pushes the token into a FIFO and an actor's input port that is to receive the token pops the token from the FIFO. An important characteristic of a FIFO (and therefore also of a connection between actor output and input ports) is that it preserves the order of the tokens contained therein; the reader of the FIFO receives the token in the same order in which that token was provided to the FIFO. Also, actors are typically able to test for the presence of tokens in a FIFO connected to one of the actor's input ports, and also to ascertain how many tokens are present in a FIFO, all without having to actually pop any tokens (and thereby remove the data from the FIFO).

The interested reader may refer to U.S. Pat. No. 7,761,272 to Janneck et al., which is hereby incorporated herein by reference in its entirety. The referenced document provides an overview of various aspects of dataflow program makeup and functionality.

As observed earlier, the amount of parallelism that can be extracted from a dataflow program is limited by feedback. This is because feedback limits the number of executions ("firings") of an actor that can be performed (simultaneously) before the actor requires an input that depends on the result of one of those firings. Reference is again made to FIG. 1, which illustrates two examples of feedback: one being the connectivity between actors C through F and another being the self-loop of actor B.

Also as mentioned above, although actors do not share state, it is in many cases convenient to allow each actor to have local state. In the general case, mutation of the local state serializes the execution of the actor (i.e., the result of one firing is required by a subsequent firing). A common practice is to represent this constraint using feedback, with each stateful actor having a connection that is a self-loop (see, e.g., the actor B in FIG. 1). Any firing of the actor (at least conceptually) reads the current state as input and produces the possibly updated state as output.

Setting aside consideration of dataflow programs for the moment, parallelization and vectorization of sequential programs have been considered in other programming contexts. Loops (i.e., iterative control-flow constructs, such as "for"-loops) traditionally form the basis of such techniques. The amount of parallelism (e.g., the number of instances of the "loop body" that can execute in parallel) is limited by data dependence.

In an imperative programming language, such as C and FORTRAN (both of which have been studied extensively in the context of parallelization and vectorization), parallelization might be limited by true data dependence as well as artificial data dependence. True data dependence is the constraint that a value must be computed before it can be used (e.g., true data dependence exists in a program in which a first statement assigns a value to a variable a, and a subsequent statement utilizes the variable a), whereas artificial data dependence stems from the fact that storage (variables of the program) can be assigned (given values) multiple times (e.g., artificial data dependence exists in a program in which a variable a is used in a program statement that precedes a subsequent statement in which the variable a is assigned a new value; in this case, the subsequent statement cannot be executed until the first statement has been executed). There are two types of artificial data dependence: anti-dependence and output dependence. Anti-dependence is the requirement that all uses of a variable must take place before the variable is reassigned. Output dependence is the constraint that the order of two assignments must be preserved.

Unlike true data dependence, artificial data dependence can, at least theoretically, be eliminated by replicating storage. Examples of practical techniques to this end are:

"Scalar renaming", which gives a variable a different "name" (storage location) in different parts of the program. Ideally, each assignment is associated with a distinct "name" (in which case no artificial dependence remains).

"Scalar expansion", by which an array is substituted for a scalar variable.

In this way, each loop iteration gets a unique storage location for the scalar variable.

There are also techniques that transform a program into a form that has an identical effect, but that avoids true data dependences that prevent parallelization. For instance:

"Induction variable substitution", which substitutes a linear expression in a loop counter for a variable that is incremented (or decremented) by a constant in each iteration of the loop. The concept of induction variables can be generalized into other sequences that can be expressed as functions of a loop counter. This technique is thus not limited to linear functions.

"Idiom recognition", which substitutes an efficient parallel implementation for part of a loop that computes a particular function (from a set of "known" functions). An example employs so-called "reductions" (sum, product, min or max, etc., over all elements in an array). Given original code that uses a scalar variable to accumulate results, which serializes loop iterations (true data dependence), each of the mentioned reductions has a parallel implementation with an equivalent effect and these implementations could be known to a compiler a priori.

The interested reader is referred to H. Zima, "Supercompilers for Parallel and Vector Computers", ACM Press, NY, USA 1991, ISBN 0-201-17560-6, pages 180, 184, 225, and 235 (which is hereby incorporated herein by reference in its entirety) for more information about the various techniques discussed above. For more information about induction variable substitution, reference is also made to M. Wolfe, "Beyond induction variables", in Proc. ACM SIGPLAN Conf on Programming Language Design and Implementation (PLDI '92), 1992, pp. 162-174, which is hereby incorporated herein by reference in its entirety.

Returning now to a consideration of dataflow programming, given that the current practice is to serialize the firings of an actor with local state, slower execution of such programs can be expected. One could avoid this result by disallowing local state in actors, but such an approach would make dataflow programming less expressive and more cumbersome to use in practice. The alternative, which involves serialized execution of actors with state, may introduce serial bottlenecks in an implementation of a dataflow program on parallel hardware (e.g., multi-core, multi-processor, vector processor systems).

The inventors of the subject matter described herein have considered that one way to address this problem is to find a way to reformulate the actor's program code in a way that retains the code's functionality while increasing parallelism between that actor's actions. One impediment in following through with this approach, however, is that the techniques that are known in the field of parallelization and vectorization of loops in sequential control-flow programs are not directly applicable in the context of dataflow programs. The main complication is that, in general, the effect of each actor firing depends on both state and inputs. This breaks the regular access patterns that are required in loops, which are candidates for parallelization (or vectorization).

Considering the bigger picture, it is a great challenge to efficiently and automatically parallelize (or vectorize) a program that is written in a sequential, imperative programming language (e.g., C or FORTRAN). By contrast, a dataflow program is parallel by construction, because its actors can execute in parallel. Nonetheless, the parallel execution of actors in a dataflow program does not bring with it parallel execution of actions within an actor. Since dataflow programs are often run in processing environments that facilitate parallel execution of processes, it would be advantageous to make use of this environment to speed up the execution of individual actors defined within a dataflow program.

It is therefore desirable to have improved dataflow program parallelizing/vectorizing methods and apparatuses for achieving higher levels of parallel code execution in connection with dataflow programs.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in, for example, methods and apparatuses for processing a dataflow program, wherein the dataflow program comprises one or more actors, each actor comprising one or more actions. Processing involves retrieving stored dataflow program instructions from a memory and analyzing an actor defined by the retrieved dataflow program instructions to identify one or more original sequences of one or more actions that can be reformulated to achieve greater execution parallelism while maintaining a same functionality as the original sequences. A processed dataflow program is produced by producing processed dataflow program instructions and decision point program instructions. The processed dataflow program instructions comprise alternative sequences of reformulated actions that achieve greater execution parallelism while maintaining the same functionality as the identified one or more original sequences. The decision point program instructions, when executed by one or more processors, cause the one or more processors to select and execute one or more of the alternative sequences of reformulated actions, wherein selecting the one or more of the alternative sequences of reformulated actions is based on state and token information in existence at the time of selection.

In an aspect of some embodiments, the decision point program instructions are logically configured to select, when two or more alternative sequences of reformulated actions can be selected for execution, a preferred alternative sequence having a highest level of parallelism among the two or more alternative sequences.

In some embodiments, analyzing the actor defined by the retrieved dataflow program instructions to identify one or more original sequences of one or more actions that can be reformulated to achieve greater execution parallelism while maintaining a same functionality as the original sequences comprises analyzing the actor defined by the retrieved dataflow program instructions to identify one or more original sequences that can be reformulated by means of any one or combination of:

scalar renaming
induction variable substitution
idiom recognition
partitioning at least one of the one or more original sequences into mutually independent periods.

In some embodiments, one or more of the one or more original sequences updates an induction variable; and the decision point program instructions, when executed by one or more processors, cause the one or more processors to determine a final value of the induction variable from an original value of the induction variable without completing a first execution of any of the alternative sequences of reformulated actions; and select and execute the one or more of the alternative sequences of reformulated actions based on the final value of the induction variable.

BRIEF DESCRIPTION OF THE DRAWINGS

FIGS. 2a, 2b, and 2c together schematically illustrate a reformulation of a sequence of actions into actions that can be executed in parallel.

DETAILED DESCRIPTION

Figure 1:
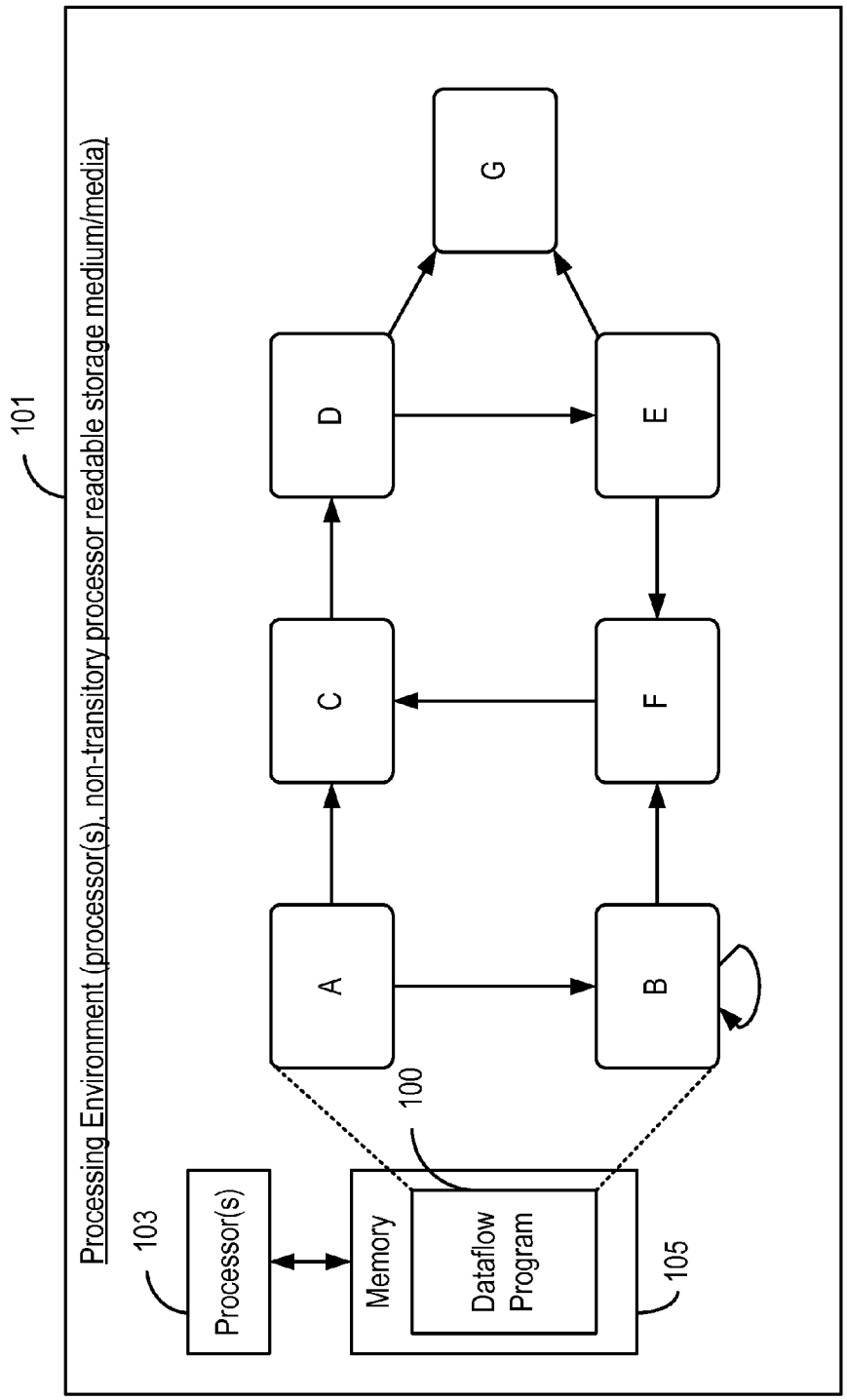
FIG. 1 illustrates an exemplary graphical representation of a dataflow program having seven actors.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, processing of dataflow programs so as to achieve a processed (reformulated) dataflow program in which dataflow actors with local state have increased parallelism (relative to the original, unprocessed dataflow program) involves reducing serialization that is caused by actors with local state. Serialization is caused by data dependence that is carried from one firing of an actor to subsequent firings. The objective of this aspect is to relax the serial order by applying techniques that eliminate dependence. To achieve this objective, new parallelization techniques that, among other things, utilize knowledge of an actor's behavior are applied.

A starting point in the processing is identification of an actor's sequence of actions, which is a finite set of transitions that the actor can take in a firing: a particular firing of the actor is performed according to an action. Data dependence is caused by the action of a first firing modifying the local state of the actor and the action of a second firing using the modified state. In the best case, all dependence between actions can be eliminated, in which case all of them can be reformulated to enable their execution in parallel.

FIGS. 2a, 2b, and 2c together schematically illustrate a reformulation of a sequence of actions into actions that can be executed in parallel. FIG. 2a depicts an original version of an actor 200 having a number, N, of actions, numbered 1 through N. In the original formulation, the actions are defined as firing in sequence, with action 1 having to fire before action 2 can fire, action 2 firing before action 3, and so on. Each depicted arrow represents the dependence of one action's firing on that of another.

FIG. 2b schematically illustrates the elimination 201-1, 201-(N−1), of dependencies between actions. This is manifested by a reformulation of one or more aspects of one or more of the actions 1 . . . N.

FIG. 2c schematically illustrates a processed (reformulated) actor 203 whose actions can be executed in parallel, as represented by their depiction at a same moment along a time line (with time running from top to bottom). It should be understood in this figure, as well as in others, that the lack of dependence between actions depicted in FIG. 2c permits but does not impose parallel execution on the actions.

The discussion will now focus on several aspects of embodiments consistent with the invention: how to identify a sequence of actions to be parallelized and then how to reformulate the identified sequence to eliminate the dependencies therebetween. In this respect, it is useful to note that different dataflow programming languages allow different levels of freedom regarding the dynamic behaviors of dataflow actors, and in particular with respect to the definable communication pattern of tokens. These communication patterns are commonly referred to as the "Model of Computation" (MoC) of the actor. Well-known MoC's include, but are not limited to:

Synchronous Dataflow (SDF)
Kahn Process Networks (KPN)
Cyclo-Static Dataflow (CSDF) (e.g., as defined in G. Bilsen et al., "Cyclo-static data flow", IEEE Int. Conf. ASSP, pp. 3255-3258 (Detroit, Mich., May 1995))
Dynamic Dataflow (DN)

A first class of embodiments applies to dataflow programs that conform to the CSDF MoC. This restriction makes it particularly easy to identify the sequence of actions. Dependency elimination techniques are then formulated that can be applied to such dataflow programs.

A second class of embodiments provides more general solutions that are not restricted to dataflow programs conforming to the CSDF MoC. Rather than a single sequence of parallelized actions that can be substituted for the originally specified actions, multiple sequences need to be considered in this class of embodiments, with runtime decisions being made to determine which sequences to run at any given moment.

Cyclo-Static Dataflow

A dataflow actor that adheres to the cyclo-static dataflow model of computation is required to have a cyclic behavior in terms of its firings. Such an actor has a period, P, and each firing belongs to a phase, 1, 2, . . . , P. After the P phases (and firings) of a period have been completed, the actor revisits the first phase. The behavior of a firing that belongs to a particular phase is given (in terms of number of input samples consumed and output samples produced). In this way a cyclic behavior, with a period of P firings, results.

A cyclo-static actor is specified in such a manner that each phase is associated with an action. The sequence of actions that corresponds to a single period (P firings) constitutes the identified sequence that will be reformulated to eliminate dependencies between actions.

The objective of this, as well as other embodiments consistent with the invention, is to allow the firings to be performed simultaneously, in parallel, while producing the same results as a serial execution of the phases. As will be described, it may be possible to parallelize the phases of a single period and it may also be possible to execute multiple periods in parallel.

Formulation of Dependence Elimination Techniques

Given a sequence of actions, it is possible to use analysis techniques, such as "live variable analysis" (also called "liveness analysis") and "reaching definitions" as defined in compiler theory (see, e.g., A. V. Aho, R. Sethi, and J. D. Ullman, "Compilers, principles, techniques, and tools", PP. 624-633 Addison Wesley, USA 1985, ISBN 0-201-10194-7) in a process to eliminate dependencies between the actions. The purpose of live variable analysis is to identify, for each program point in program code, those variables (called "live variables") that may potentially be read (and therefore may be needed) before their next write. A reaching definition is, for a given instruction, another instruction, the target variable of which may reach the given instruction without an intervening assignment.

Indefinite repetition of the sequence of actions can be modeled in the same way as a(n) (infinite) loop would be by means of standard techniques. In particular, a definition made in a first action might reach the end of the period and thus reach a second action at the beginning of the following period.

In an aspect of embodiments consistent with the invention, in what follows individual variables of an actor's local state are considered. This is in contrast to treating them collectively as an aggregate as proposed in E. A. Lee and T. M. Parks, "Dataflow process networks," in Proceedings of the IEEE, vol. 83, no. 5, pp. 773-801. In this way, different elimination techniques can be applied to different variables.

Scalar Renaming

Figures 3A, 3B:
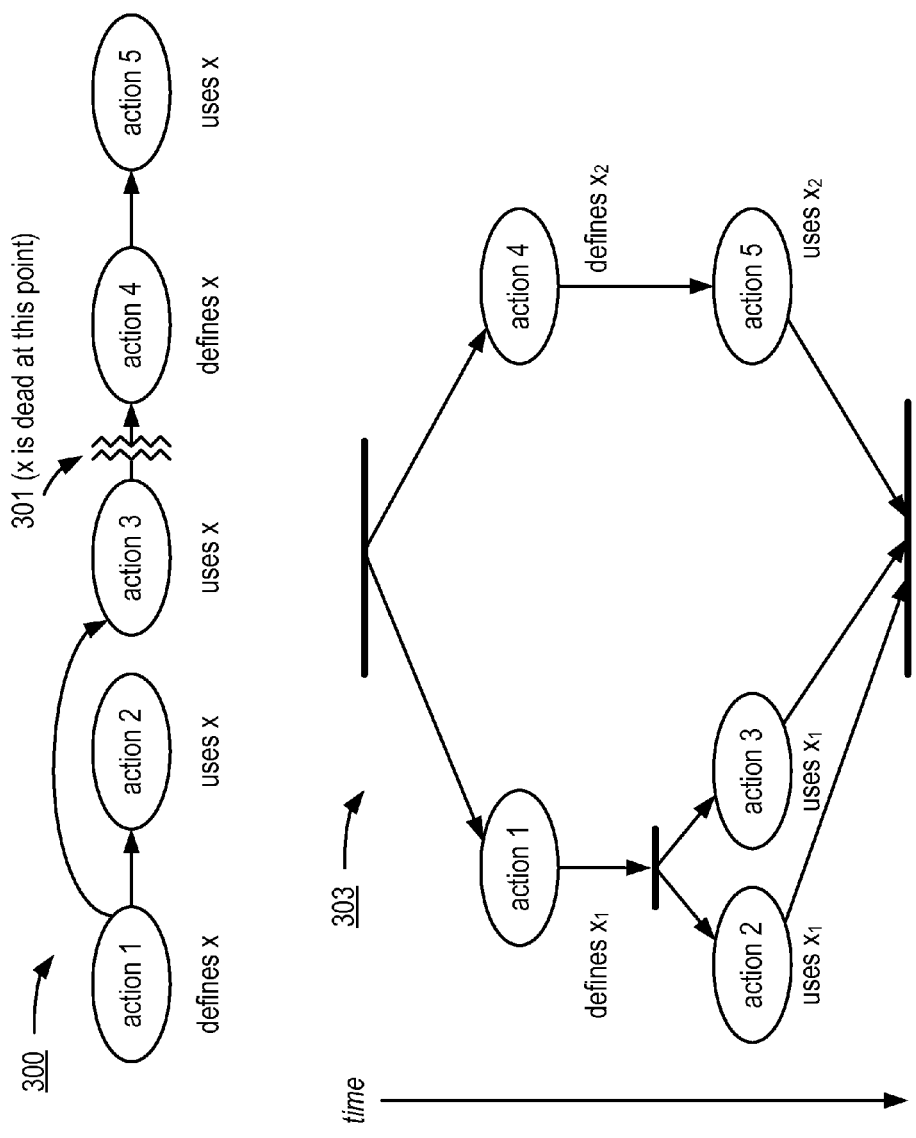
FIGS. 3a and 3b illustrate the use of scalar renaming to eliminate artificial dependencies in a sequence of actions and thereby to enable parallel execution of actions.

Standard techniques can be used to split each variable into its live ranges and associate a distinct "name" (i.e., storage location) to each live range. (See, e.g., the Zima reference cited earlier). This eliminates artificial dependencies within one period (one sequence of actions), which enables parallel execution. This is schematically illustrated in FIGS. 3a and 3b. FIG. 3a depicts an original formulation of an exemplary dataflow programming actor 300. The actor 300 comprises five actions, numbered 1 through 5. Action 1 defines a variable x, which is used by both action 2 and action 3. In this example, action 3 has no dependencies on action 2. Hence, it can be seen that action 3 can be fired immediately after the variable x is made available by action 1.

Further in this example, action 4 defines the variable x, and action 5 uses this value of x. It can therefore be seen that action 5 depends on the firing of action 4, so that action 5 cannot fire until after the firing of action 4. However, it can further be seen from live variable analysis that the variable x produced by action 1 is dead before it reaches action 4. (This follows from the fact that the value of variable x assigned by action 1 has no possibility of being used by either of actions 4 and 5.) Thus, the variable x has two live ranges: one starting at the definition in action 1, including the uses in actions 2 and 3; and the other starting at the definition in action 4 and including the use in action 5. In accordance with an aspect of embodiments consistent with the invention, artificial dependence is eliminated by using distinct storage locations (i.e., names, which in this example are denoted "$x_1$" and "$x_2$") for the live ranges, after which it is possible to execute actions 1 and 4 in parallel as illustrated in FIG. 3b, which is a schematic diagram of the processed (reformulated) actor 303. It will be observed that in this example, actions 2 and 3 still depend on action 1, so they sequentially follow action 1 (although as observed before, actions 2 and 3 can fire in parallel). Similarly, action 5 depends on action 4 and so sequentially follows action 4 in the reformulated actor 303.

Dependence between periods is eliminated in the same way, by additional storage. See the section entitled "Identifying mutually independent periods" below for further detail.

Scalar renaming is most often applied to scalar variables (scalar renaming), but extension to arrays is known in the art (e.g., see "variable copying" described in the above-referenced Zima reference at pp. 229-230) and can be applied as well.

Induction-Variable Substitution

This technique is traditionally applied in the context of loops as are found in control-flow programs. The idea is to eliminate dependencies caused by loop-carried dependencies of the form x:=x+constant. When formulated in this way, the value assigned to the variable x in any given iteration of the loop depends on the value that the variable x has upon entry into the loop. Such program statements are replaced by an expression of the form $x_0+i*\text{constant}$, where "$x_0$" is the initial value of x, and "i" is a so-called "basic induction variable" (loop counter). See pages 180-182 of the above-referenced Zima publication for an example. In this way, the value of the variable x can be computed without depending on the previous iteration of the loop.

In accordance with an aspect of embodiments consistent with the invention, parallelization of actions in a dataflow program's actor can be achieved by similarly determining the value of the variable x based on its value at the start of the period (again denoted $x_0$), and some position, p, in the sequence of actions:

$$x_0+\text{constant}_p,$$

where "$\text{constant}_p$" summarizes the updates made from the start of the period to the program point signified by position p.

Figure 4A:
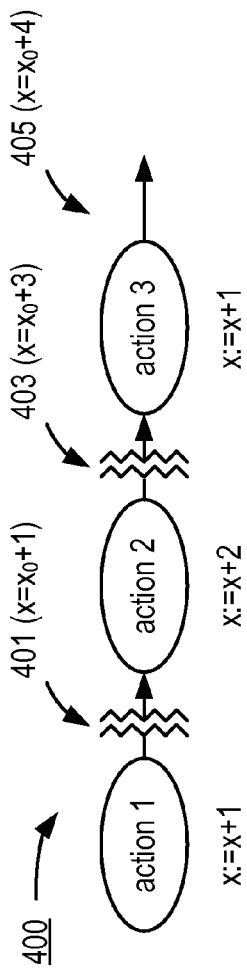
FIGS. 4a and 4b schematically illustrate the technique of induction variable substitution in the context of a dataflow program actor.
Figure 4B:
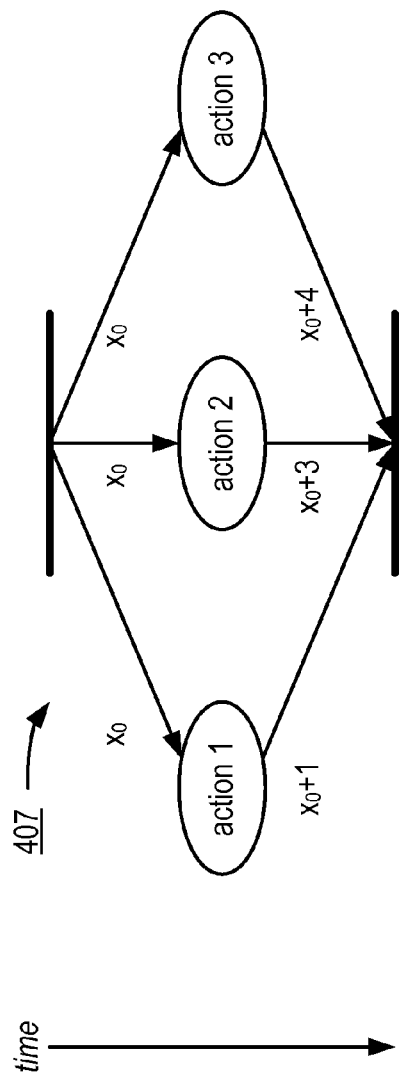

FIGS. 4a and 4b schematically illustrate the technique of induction variable substitution in the context of a dataflow program actor. FIG. 4a depicts the original actor 400. The actor comprises a sequence of three actions, numbered 1 through 3. Action 1 computes x:=x+1. Action 2 uses the value generated by action 1 in its computation of x:=x+2, and hence depends on action 1 firing before it can fire. Action 3 in turn uses the value generated by action 2 in its computation of x:=x+1, and hence depends on action 2 firing before it can fire.

The dependencies between actions 1 and 2 and between actions 2 and 3 can be broken, and thereby parallel firing made possible, by induction variable substitution, which in this example is achieved by substituting an expression written in terms of the initial value, $x_0$, of the variable x, for the value of x that occurs in each phase of the period. Accordingly, the dependence between actions 1 and 2 can be broken 401 by observing that the output of action 1 will always be $x=x_0+1$. With this as the input to action 2, and by observing that action 2 adds the constant "2" to the received value of x, the dependence between actions 2 and 3 can be broken 403 by observing that the output of action 2 will always be $x=x_0+3$. Similarly, it is observed that action 3 always adds the constant "1" to the received value of x, so that its output can be expressed as $x=x_0+4$.

The processed (reformulated) dataflow actor 407, achieved by means of induction variable substitution, is depicted in FIG. 4b. It can be seen that the three actions (action 1, action 2, action 3) can be fired in parallel. Each receives the initial value, $x_0$. Action 1 outputs a value $x_0+1$, action 2 outputs a value $x_0+3$, and action 3 outputs a value $x_0+4$.

In some instances, it is possible to determine the final value of a variable, given only its initial value. FIGS. 4a and 4b illustrate one example, in which the final value of the variable x is $x_0+4$. It is thus possible to anticipate the initial value of x in following periods ($x_0+4n$, n=1, 2, 3, ... ), which means that the mutation of x does not prevent periods from executing in parallel.

The approach can be generalized to other sequences such as but not necessarily limited to "wrap-around variables", "flip-flop variables", "families of periodic variables", and "polynomial and geometric induction variables" as proposed in the Wolfe reference cited earlier. The value of a (generalized) induction variable, x, is computed using its value at the start of the period, $x_0$, and some position, p, in the sequence of actions. In this way, dependence (with respect to the variable x) on preceding actions is eliminated.

Idiom Recognition

The traditional setting (i.e., in the context of control-flow/imperative programming) is to eliminate dependencies caused by serial implementations of commonly appearing functions, such as the sum over a collection of elements:

$$\text{sum}:=\text{sum}+\text{element}[i].$$

By instead using a parallel implementation that accumulates the sum, the serialization caused by dependence on the variable sum is avoided.

In the context of dataflow programming, a collection of elements is identified by inspecting the sequence of actions. In the transformed actor, the task of the actions that are involved in the idiom is to compute the elements and store them in a temporary array. The parallel (program development tool-generated) algorithm corresponds to one or several additional actions that are performed as part of the actor's period.

Figure 5A:
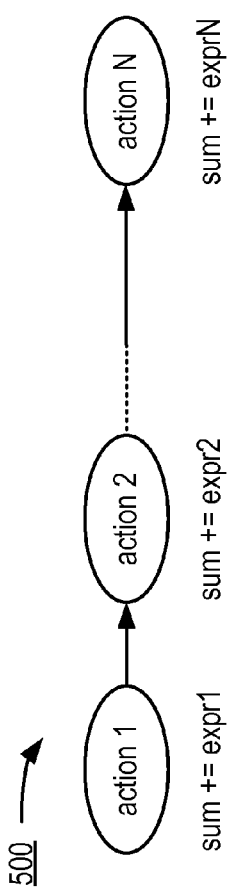
FIGS. 5a and 5b schematically illustrate the use of idiom recognition in the context of a dataflow program actor to enable reformulation of the actor to include parallelism.
Figure 5B:
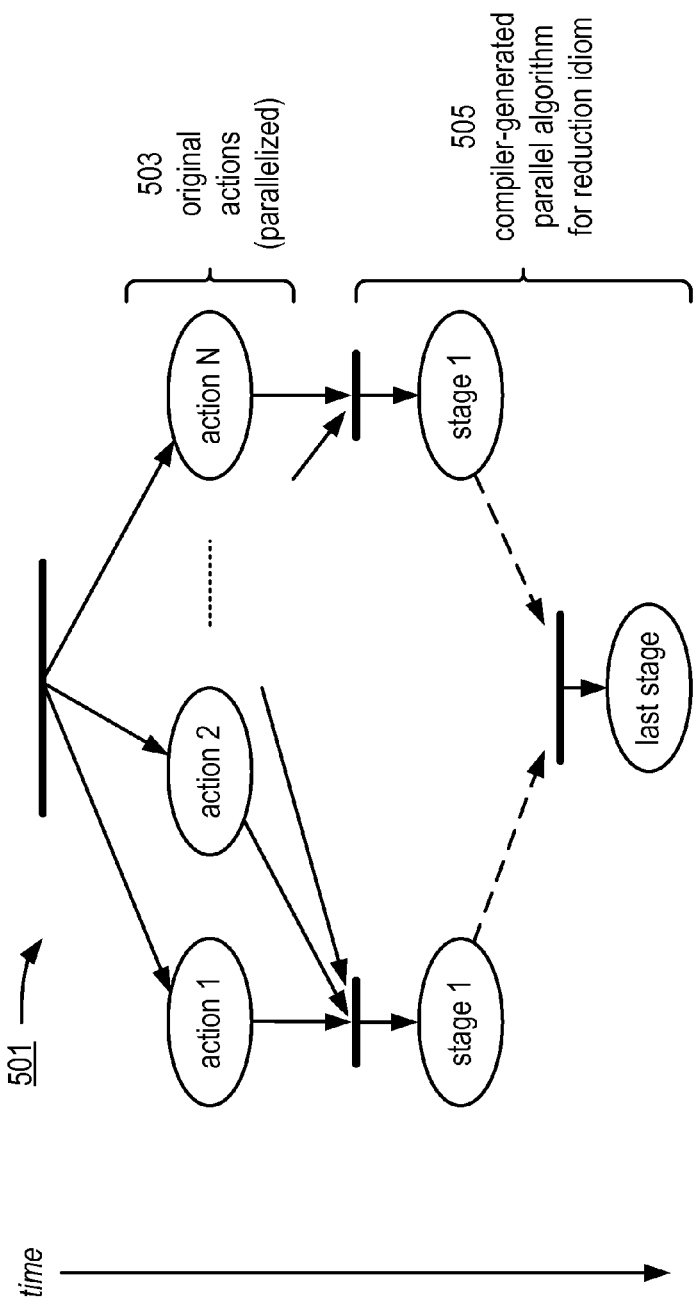

FIGS. 5a and 5b schematically illustrate this technique. FIG. 5a is an example of an original program 500 having some number of actions, numbered 1 through N. Each action contributes to an accumulated sum, represented by the variable "sum": action 1 adds the value of a first expression (expr1) to sum (the operator "+=" is an addition assignment operator); action 2 adds the value of a second expression (expr2) to sum, and so forth up through action N, which adds the value of an $N^{th}$ expression (exprN) to sum. In this formulation, there is true data dependence carried by the variable sum, in which the sum is accumulated, and this causes serialization of the actions to be required.

The processed (reformulated) dataflow actor 501, arrived at by an idiom recognition technique (adapted for use in a dataflow programming environment) is depicted in FIG. 501. The transformed code 501 comprises a sequence of operations, each of which itself includes actions that can be performed in parallel. In a first set of operations 503, the original actions specified by the original program 500 are permitted to be run in parallel, but without assigning their respective expressions (e.g., expr1, expr2, . . . , exprN) to the accumulating variable sum. In a second set of operations 505, a dataflow program development tool (e.g., a compiler) generates one or more stages of operations (e.g., "stage 1", . . . , "last stage"), each stage comprising parallel operations that each generate a partial sum of some of the outputs from the actions 1 through N. The partial sums are then supplied to a next stage which may comprise a plurality of further actions to generate a set of further partial sums by combining respective groups of the first set of partial sums. This continues until a final set of partial sums is supplied to the last stage, which combines all final partial sums to generate a total accumulation having the same value as would have been supplied at the output of action N in the original program 500. A benefit is achieved when the number of actions performed in sequence in the processed dataflow actor 501 is less than the number, N, of actions in the original program 500.

In processing the original dataflow program 500 as illustrated in FIGS. 5a and 5b, it should be noted that the idiom may include only part of the actions (e.g., in the illustrated example only part of the actions may update the sum) and the elements of a reduction may differ in form (e.g., the terms may be computed differently in different actions).

Dealing with Remaining Data Dependence

The techniques described above address special cases. In the general case, there will be remaining data dependence. The starting point for handling these is a total ordering of the P actions. If some, but not all, data dependence can be eliminated, a partial order results: each remaining dependence edge constrains the execution order such that a particular set of firings have to be completed before another, given, firing can take place. It is well-known in the context of control flow parallel programming that such "precedence constraints" can be enforced with synchronization mechanisms, such as "barriers" as described in the above-cited Zima reference at page 270. The horizontal bars depicted in each of FIGS. 2c, 3b, 4b, and 5b, which have multiple incoming arrows, signify barriers. (The bars with multiple outgoing arrows signify control-flow forks.)

Identifying Mutually Independent Periods

A particularly interesting case is presented when the state is dead at the end of the last action in the period (i.e., when no definitions from a first period reach the following period). In this case, the periods are mutually independent and can execute in parallel. To avoid violating artificial dependence, the state needs to be replicated so that there is one instance per period. In essence, this corresponds to scalar expansion of all state variables.

A generalization of this idea examines not only properties of an entire period, but also subsets of actions within a period, in order to identify any possible point at which the state is dead, even if this point does not coincide with the end of the period. In such cases, it is possible to partition the firings of a period (the P positions of the sequence) into two blocks, for example denoted $P_1$ and $P_2$, such that:

a) there is no dependence from any of the firings in $P_1$ to a firing in $P_2$; nor to a firing in a subsequent period; and b) there is no dependence to any of the firings in $P_2$ from a prior period (nor from a firing in $P_1$).

Properties "a" and "b" specify that the state is dead after executing all the actions in $P_1$, but before executing any of the actions in $P_2$. By initially executing all actions in $P_1$ (once) and then (repeatedly/indefinitely) executing $P_2$ followed by $P_1$, a new ordering of the actions results, such that the state is dead at the end of the last action in the period. After replication of storage, as described above, the (new) periods become mutually independent and can execute in parallel.

Figures 6A, 6B:
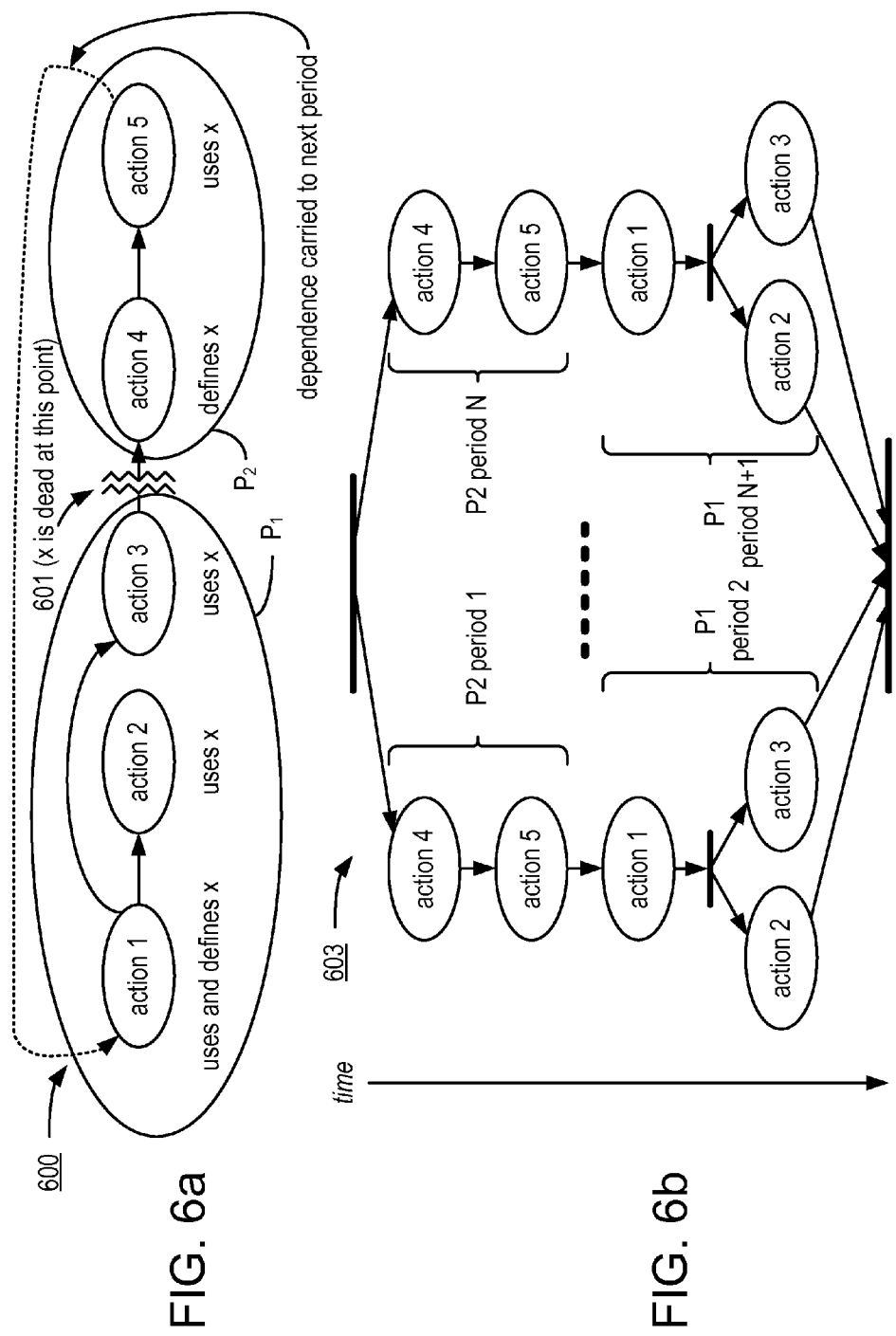
FIGS. 6a and 6b illustrate the technique of breaking apart mutually independent periods and portions thereof to achieve greater parallelism within a dataflow program actor.

FIGS. 6a and 6b illustrate the technique of breaking apart mutually independent periods and portions thereof to achieve greater parallelism within a dataflow program actor. FIG. 6a depicts an exemplary original dataflow actor 600, having five actions, numbered 1 through 5. In this example, action 1 first uses a variable x and then (re-)defines x. During a first period, it is assumed that x is either set to some initial value, or alternatively that it is acceptable for x to have an undefined value.

Further in this example, each of actions 2 and 3 uses the value of x assigned by action 1. It can therefore be seen that the firing of each of actions 2 and 3 is dependent on a predecessor firing of action 1. In this example, action 3 does not have any dependence on action 2, so that action 2 and action 3 can be fired in parallel.

Continuing with the example, action 4 defines the variable x without using it, and action 5 uses the value of x generated by action 4. Accordingly, the firing of action 5 depends on the firing of action 4. Further in this example, the value of x produced by action 5 persists and is therefore used at the beginning of the next period of the actor 600 (as represented by the dotted line feeding back from an output of action 5 to an input of action 1).

An analysis of the actor 600 reveals that x is dead at point 601 because it has no possibility of being used by either of actions 4 and 5. Accordingly, the period of actor 600 can be broken up into two blocks, $P_1$ (comprising actions 1, 2, and 3) and $P_2$ (comprising actions 4 and 5) as shown in the figure. Breaking up the period into blocks in this manner permits parallel firing of multiple periods, with each period's implementation having its own replicated storage.

FIG. 6b schematically illustrates the processed (reformulated) actor 603 after the original actor 600 has been broken up into mutually independent periods. Period 1 for block $P_1$ cannot rely on any previously generated value of x (i.e., because it is the first running of block $P_1$, and $P_2$ will not have been run yet in accordance with the original formulation of the actor 600). Therefore, period 1 of block $P_1$ can be implemented independently as a firing of action 1, followed by parallel firings of actions 2 and 3. This initial firing of $P_1$, period 1 is not shown in the figure in order to avoid cluttering the drawing, but its depiction would look like, for example, the actions associated with block $P_1$, period 2.

The remaining code is formulated, for each period i, (i=1, ..., N) as the actions of block P2 period i followed by the actions of block $P_1$, period i+1. The firings of period i+1 of block $P_1$ must follow the firings of period i of block $P_2$ because of action 1's dependence on the output of action 5. In this case, the actions of block $P_2$ must operate in sequence due to the dependence of action 5 on the output of action 4, and the firing of action 1 must precede the parallel firings of actions 2 and 3 because of the dependence of actions 2 and 3 on the output of action 1. However, even in implementations having no possibility of parallel execution within any given period, large benefits are achieved due to the ability to parallelize the firings of the different periods.

It is further noted that the special case in which $P_1$ is empty corresponds to the case discussed initially in this section, namely, the case that is presented when a state is dead at the end of the last action in the period (no definitions from a first period reach the following period).

Generalization for Dynamic Dataflow

In contrast to the special case of cyclo-static dataflow (discussed so far), it is not possible in general to anticipate the exact sequence of actions beforehand. In particular, the choice of actions to execute might depend on the input received.

Accordingly, embodiments consistent with this aspect of the invention relax this assumption. It is instead assumed that there are a number of decision points, at which input and state are used in a run-time test, which selects one of several possible sequences of actions. The action sequences are determined beforehand (e.g., at compile time), and include parallelized versions of some actions specified in an original version of the program code that defines the actor.

The assumption is sufficiently general to include all dataflow actors. In the extreme case, however, each action can be followed by any of the actions. The sequences then consist of only a single action and there is a decision point between each pair of firings. In specific cases, the sequences may be longer and the set of possible continuations may be limited, which allows the techniques described above with respect to cyclo-static dataflow programs to be generalized.

It has been demonstrated (see, e.g., K.-E. Arzen, A. Nilsson, and C. von Platen, "D1e—Model Compiler," published on Jan. 29, 2011 at http://www.control.lth.se/user/karlerik/Actors/M36/d1e-main.pdf) that it is possible, using static analysis of a dataflow actor's source code, to identify decision points and control flow (in terms of action sequences). Following this approach, the behavior of an actor can be modeled as a control-flow graph, in which each node corresponds to either a decision point or to a sequence of actions and the directed edges specify possible control-flow paths.

Figure 7:
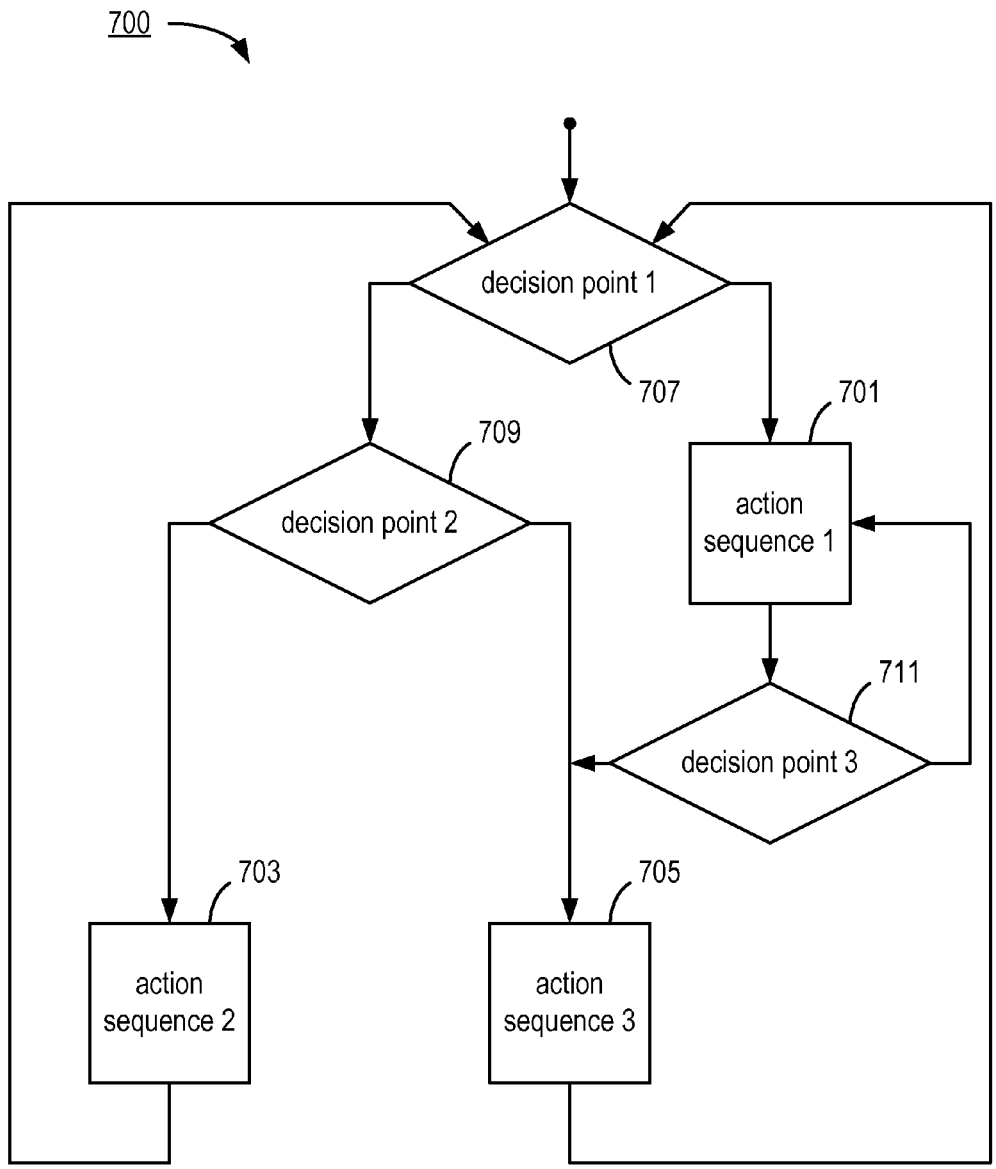
FIG. 7 depicts the behavior of a processed (reformulated) actor 700, modeled as a control-flow graph, whose nodes represent decision points and sequences of actions.

FIG. 7 is an exemplary control-flow graph 700 that is used in this discussion to illustrate this aspect of inventive embodiments. In particular, FIG. 7 depicts the behavior of a processed (reformulated) actor 700, modeled as a control-flow graph, whose nodes represent decision points and sequences of actions. The action sequences 701, 703, 705 are possibilities, based on a static analysis of the original dataflow program source code. The decision points 707, 709, 711 are also determined from static analysis of the original dataflow program source code, but they are decided at runtime based on the values of variables and states in existence at any given moment.

Just like it may be possible to parallelize the phases of a single period using the first-described embodiment (e.g., the special case of cyclo-static dataflow), it may be possible to execute the actions of a single action sequence in parallel, once the run-time decision has been resolved.

Scalar renaming, induction-variable elimination and idiom recognition (described earlier for the special case of cyclo-static dataflow) also apply to the action sequences of this embodiment. As before, possible remaining dependence, which could not be eliminated, requires synchronization.

Just like it may be possible to parallelize multiple periods as described earlier for the special case of cyclo-static dataflow, it may be possible to execute the actions of multiple action sequences in parallel. In order to dispatch a second sequence of actions before a first sequence has completed, case must be taken not to violate data dependence.

Further, it must be possible to evaluate the required run-time test (e.g., decision points 707, 709, 711) without waiting for the results of the first sequence. It is clearly possible to do so if the decision is based solely on input (i.e., if no state information is required).

It is also possible to do so if the decision is based on a variable, which the first action sequence updates as a (generalized) induction variable. Then the variable's final value (after the first action sequence) can be determined using only its initial value (before the first action sequence) as was described above. This means that the run-time test can be evaluated without first having completed the first action sequence.

Figure 8:
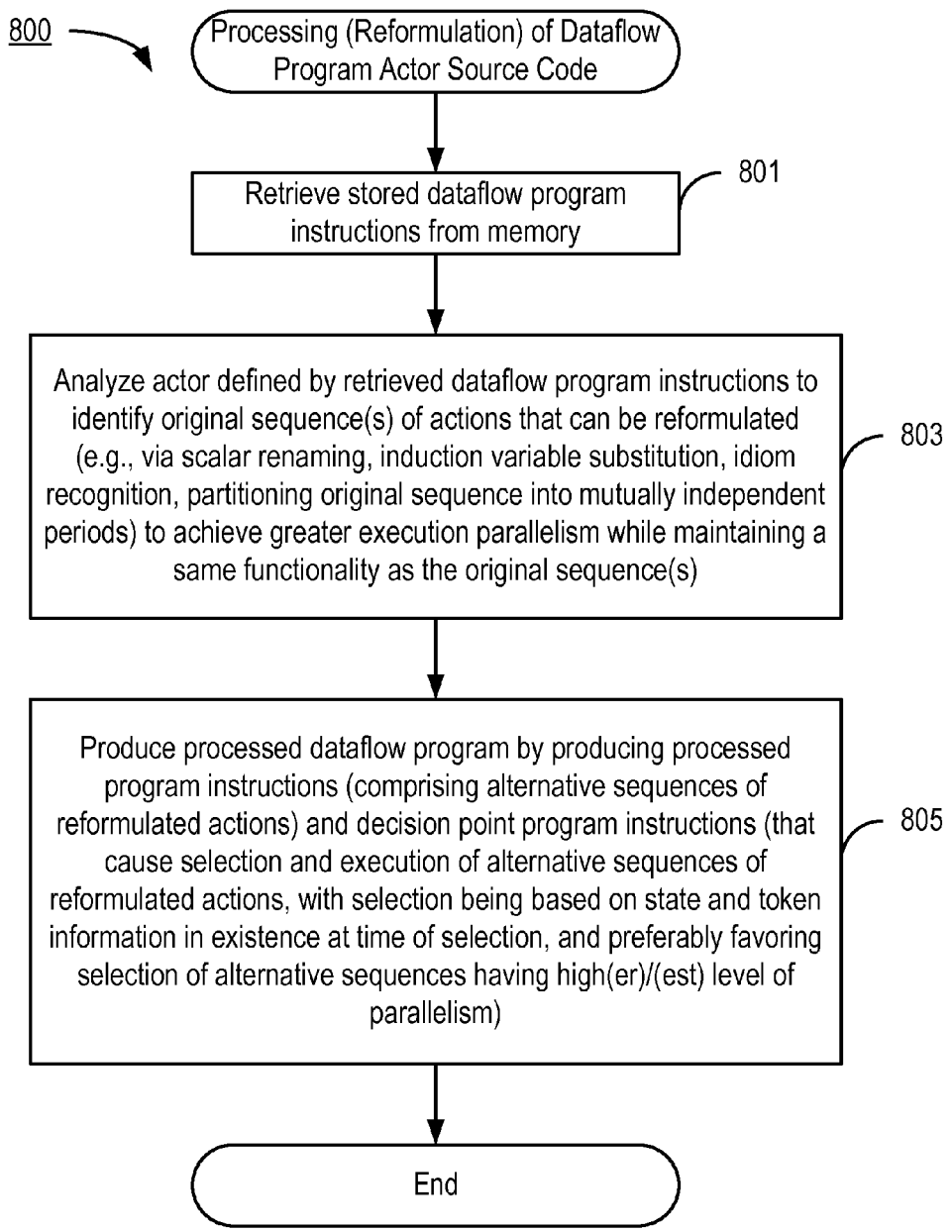
FIG. 8 is, in one respect, a flow chart of steps/processes performed by a dataflow program development tool in accordance with some but not necessarily all exemplary embodiments of the invention.

To further illustrate aspects of embodiments consistent with exemplary embodiments of the invention, FIG. 8 is, in one respect, a flow chart of steps/processes performed by a dataflow program development tool in accordance with some but not necessarily all exemplary embodiments of the invention. In another respect, FIG. 8 can be considered to depict exemplary means 800 comprising the various illustrated circuitry (e.g., hard-wired and/or suitably programmed processor) configured to perform the described functions.

This exemplary embodiment focuses on aspects relating to the processing/reformulation of dataflow program actor source code (the "original" code) to produce, for one or more actors defined by the original code, processed program code that is capable of executing with higher parallelism than executable code corresponding to the original data flow program actor source code while maintaining a same functionality as the original sequences of the actor(s). At the outset, the original dataflow program source code is stored in a non-transitory processor-readable storage medium. Hence, this embodiment begins by retrieving stored dataflow program instructions from the memory (step 801).

The actors defined by the retrieved dataflow program instructions are then each analyzed to identify one or more original sequences of one or more of the actor's actions that can be reformulated to achieve greater execution parallelism while maintaining a same functionality as the original sequences of that actor (step 803).

A processed dataflow program is then produced by producing processed dataflow program instructions and decision point program instructions (step 805). The processed dataflow program instructions comprise alternative sequences of reformulated actions that achieve greater execution parallelism while maintaining the same functionality as the identified one or more original sequences. The decision point program instructions, when executed by one or more processors, cause the one or more processors to select and execute one or more of the alternative sequences of reformulated actions, wherein selecting the one or more of the alternative sequences of reformulated actions is based on state and token information in existence at the time of selection.

In preferred but not necessarily all embodiments, the decision point program instructions are logically configured so that, when it is possible to select two or more alternative sequences of reformulated actions for execution to select, a preferred alternative sequence having a highest level of parallelism among the two or more alternative sequences is selected. This is for the purpose of dynamically achieving the highest level of parallelism possible for the given token and state information in existence at the time.

The analysis (step 803) and subsequent production of processed program instructions (step 805) can use any one or combination of the following techniques (described earlier):
   scalar renaming
   induction variable substitution
   idiom recognition
      partitioning at least one of the one or more original sequences into mutually independent periods Also in some embodiments, in instances in which an original sequence updates an induction variable, producing decision point program instructions (step 805) includes production of program instructions that, when executed by one or more processors, cause the one or more processors to determine a final value of the induction variable from an original value of the induction variable without completing a first execution of any of the alternative sequences of reformulated actions; and to select and execute the one or more of the alternative sequences of reformulated actions based on the final value of the induction variable.

Figure 9:
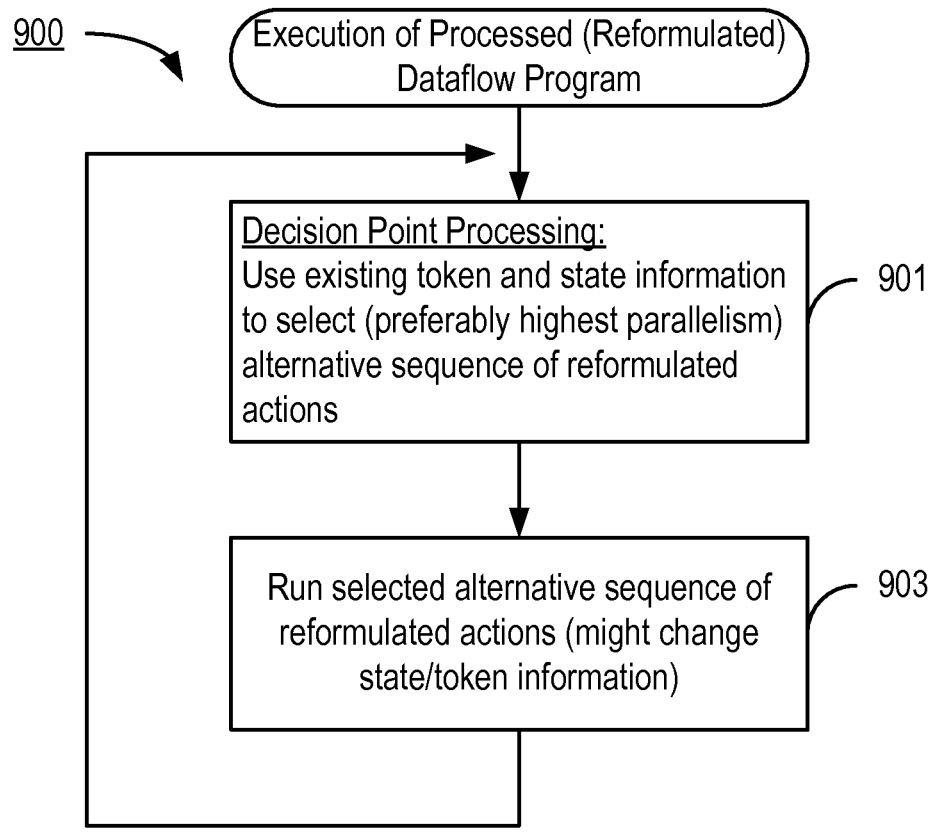
FIG. 9 is, in one respect, a flow chart of steps/processes performed by a runtime environment for the processed (reformulated) dataflow program in accordance with some but not necessarily all exemplary embodiments of the invention.

To further illustrate aspects of embodiments consistent with exemplary embodiments of the invention, FIG. 9 is, in one respect, a flow chart of steps/processes performed by a runtime environment for the processed (reformulated) dataflow program in accordance with some but not necessarily all exemplary embodiments of the invention. In another respect, FIG. 9 can be considered to depict exemplary means 900 comprising the various illustrated circuitry (e.g., hard-wired and/or suitably programmed processor) configured to perform the described functions.

This exemplary embodiment focuses on aspects relating to the execution of the processed (reformulated) program instructions (including decision point processing) that can be produced by, for example, techniques such as were described above with reference to FIG. 8. During execution, decision point processing (step 901) involves execution of the decision point program instructions that were produced as output from the processing (reformulation) of the original dataflow program actor source code. The decision point processing tests existing token and state information, and uses these values as a basis for selecting which of a number of alternative sequences of reformulated actions will be run. Selection is based on whether the sequence is ready to be executed (i.e., whether the required input token and state information is ready to be used). Preferably, when more than one of these alternative sequences can be executed, one having a highest level of parallelism is selected.

Once an alternative sequence of reformulated actions has been selected, it is run (step 903). Any execution of an action sequence has the potential to change token and state values. Accordingly, processing returns to step 901 so that another one of the alternative sequences can be selected and then executed.

Figure 10:
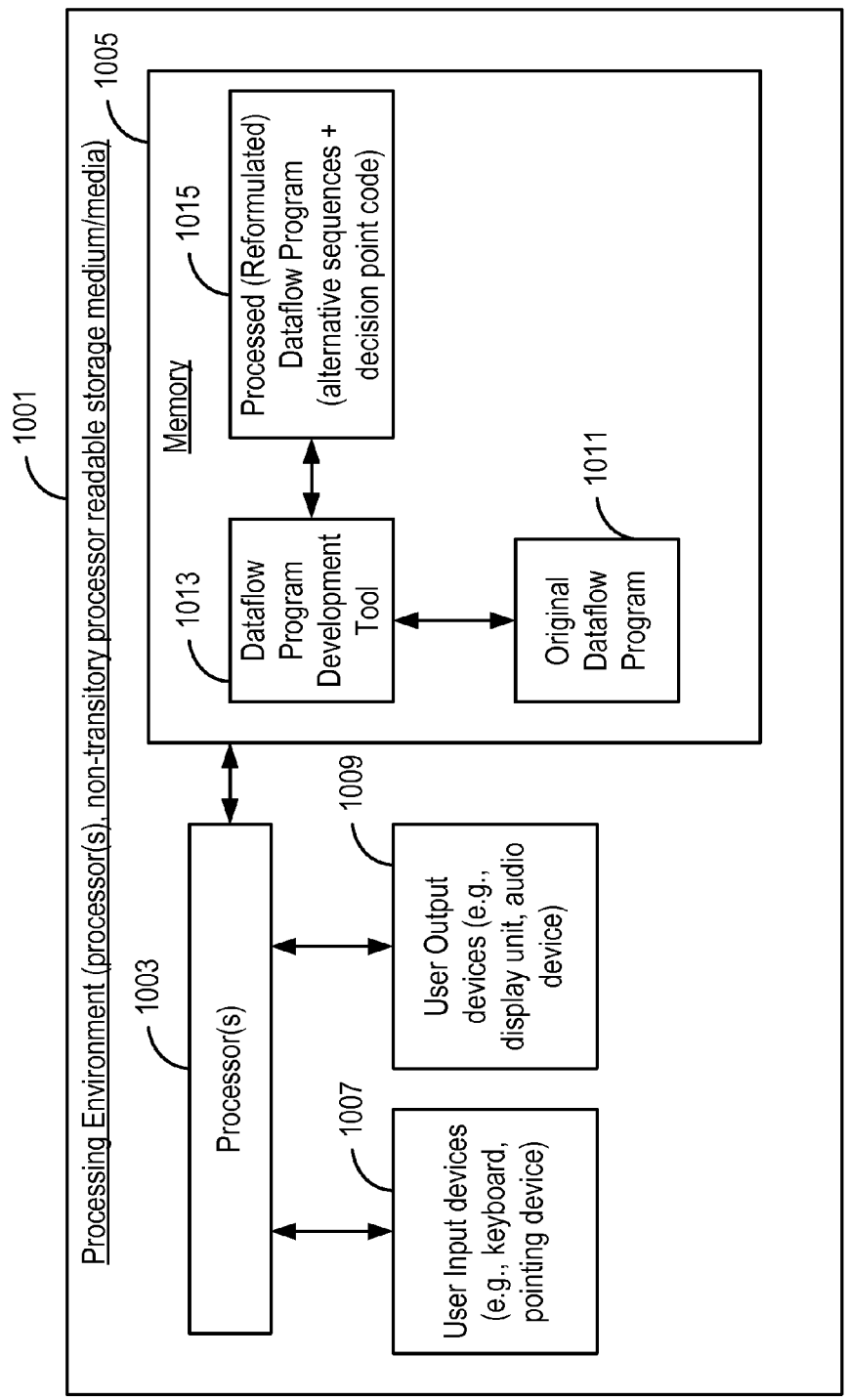
FIG. 10 is a block diagram showing a class of exemplary embodiments of a processing environment that includes elements for enabling increased parallelization of dataflow actors.

In another aspect of embodiments consistent with the invention, the parallelization of dataflow actors with local state can be carried out in any of a number of ways. FIG. 10 is a block diagram showing a class of exemplary embodiments of a processing environment that includes elements for enabling increased parallelization of dataflow actors.

A processing environment 1001 is provided that comprises one or more processors 1003 coupled to processor-readable media (e.g., one or more electronic, magnetic, or optical memory devices 1005—hereinafter generically referred to as "memory 1005"). The user is able to interact with and control the processor(s) 1003 by means of user input devices 1007 (e.g., keyboard, and some sort of pointing device) and user output devices 1009 (e.g., display unit, audio device).

The processor(s) 1003 are configured to access the memory 1005 to retrieve the original dataflow program instructions 1011 as well as program instructions that constitute a dataflow program development tool associated with a simulator 1013. Use of a simulator 1013 is advantageous during the early stages of dataflow program development because of the relatively few steps involved in altering the dataflow program and debugging it. In this exemplary embodiment, the simulator 1013 retrieves the stored dataflow program instructions 1011, and analyzes these as described earlier to identify opportunities to reformulate the dataflow program in a manner that will achieve increased parallelism of action sequences. Following analysis, the dataflow program development tool 1013 produces the processed dataflow program (1015) which, as described earlier, includes both reformulated dataflow program sequence alternatives as well as decision point program instructions.

In an arrangement such as the one depicted in FIG. 10, the dataflow program 1011 is executed in the simulation environment of the dataflow program development tool 1013 instead of in the release execution runtime environment. Such simulation executes the processed (reformulated) dataflow program 1015 based on a representation of the processed (reformulated) dataflow program 1015 that is not machine code but is instead at a higher level structure such as a canonical representation of all statements, expressions and definitions in the processed dataflow program 1015. Alternatively, the dataflow program development tool (including simulator) 1013 directly interprets the source code of the processed dataflow program 1015.

In this case the dataflow program development tool with simulator 1013 itself contains methods for running the decision point processing code at necessary execution points to select which of the various alternative sequences to run next (e.g., as illustrated in FIG. 9).

Figure 11:
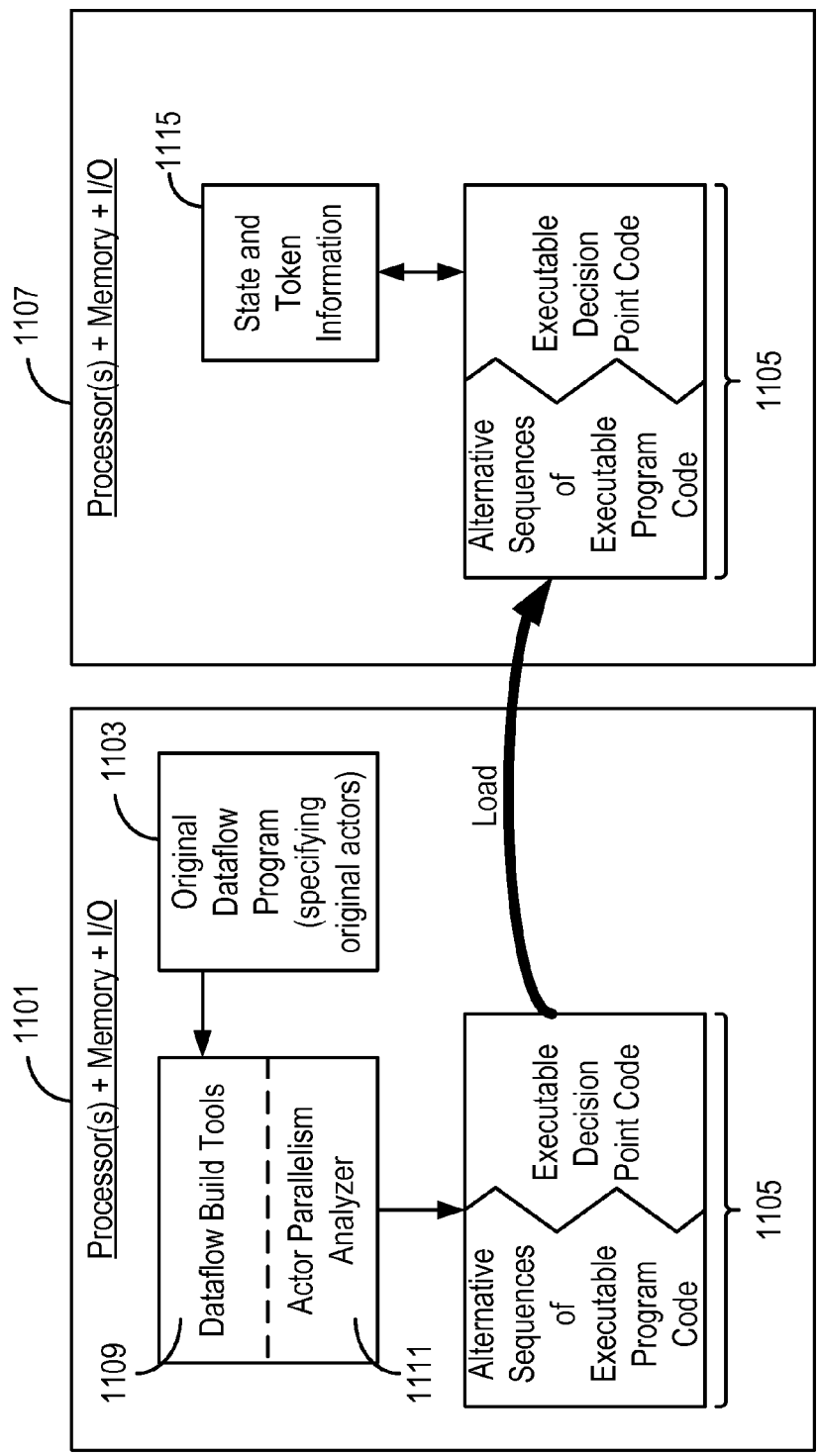
FIG. 11 is a block diagram showing a class of exemplary alternative embodiments of processing environments that include elements for enabling production and execution of a processed (reformulated) dataflow program having more parallelism than, and the same functionality as, actors in an original dataflow program.

FIG. 11 is a block diagram showing a class of exemplary alternative embodiments of processing environments that include elements for enabling production and execution of a processed (reformulated) dataflow program having more parallelism than, and the same functionality as, actors in an original dataflow program. The approach taken in this class of embodiments is to extend the dataflow program's runtime environment by incorporating decision point logic that dynamically decides which of a number of alternative sequences of actions to run, with the decision being made based on currently existing token and state information. Then, during the scheduler's evaluation of what action to execute next, the decision point logic is run in-between action sequences to decide what next sequence to run. The runtime has access to data structures for the FIFO buffers and data structures storing internal actor states. The decision point code can be either compiled or interpreted. If compiled, the code is dynamically added to the processed executable program code and executed.

In the general case, two processing environments, each including one or more processors, some sort of memory, and user Input/Output (I/O) devices, are utilized. It is contemplated that embodiments utilizing just one processing environment could also be created. A first processing environment 1101 is utilized to analyze the original dataflow program 1103 and create therefrom executable processed (reformulated) code 1105 that can be loaded into and executed by a second processing environment 1107. Creation of the executable processed code 1105 is achieved by supplying a representation of the original dataflow program 1103 to dataflow build tools 1109 (e.g., compiler, assembler, etc.), which includes (or alternatively communicates with) an actor parallelism analyzer 1111. The actor parallelism analyzer 1111 assesses each actor's action sequences to determine which, if any, can be reformulated into processed code whose alternative sequences include sequences with higher levels of parallelism than the original sequences. The results of this analysis guides the dataflow build tools' 1109 creation of alternative executable sequences of actions as well as of the corresponding executable decision point code that will select which of the alternative executable sequences to run based on runtime values of token and state information.

It will be seen then, that in this class of embodiments, an original dataflow program 1103 (defining original actors) is a high level description of a method/program. This description is reformulated using above-described principles and translated into machine code 1105 that is executed on a device/computer constituting the second processing environment 1107. During the compilation, the actor parallelism analyzer 1111 in conjunction with the dataflow build tools 1109 can do many transformations of the original dataflow description 1103. Specifically for a dataflow program, a mechanism for executing the actor's actions when data is available, space is available for output and specific state/guard conditions are fulfilled is incorporated. A program that is compiled for debugging (or generally for release but with dynamic/runtime enablement) can introduce methods for also executing decision point logic that uses up-to-date values of state and token information 1115 that are generated as various alternative sequences of executable program code are executed. The executable decision point code is inserted in the generated executable in a manner that executes these in accordance with the data flow execution.

This class of embodiments, in which the reformulated alternative sequences of dataflow actions and decision point code are, in essence, compiled together to form a single executable code entity 1105, is advantageous during "on target device/computer" development because it has low overhead and enables high execution speed.

Figure 12:
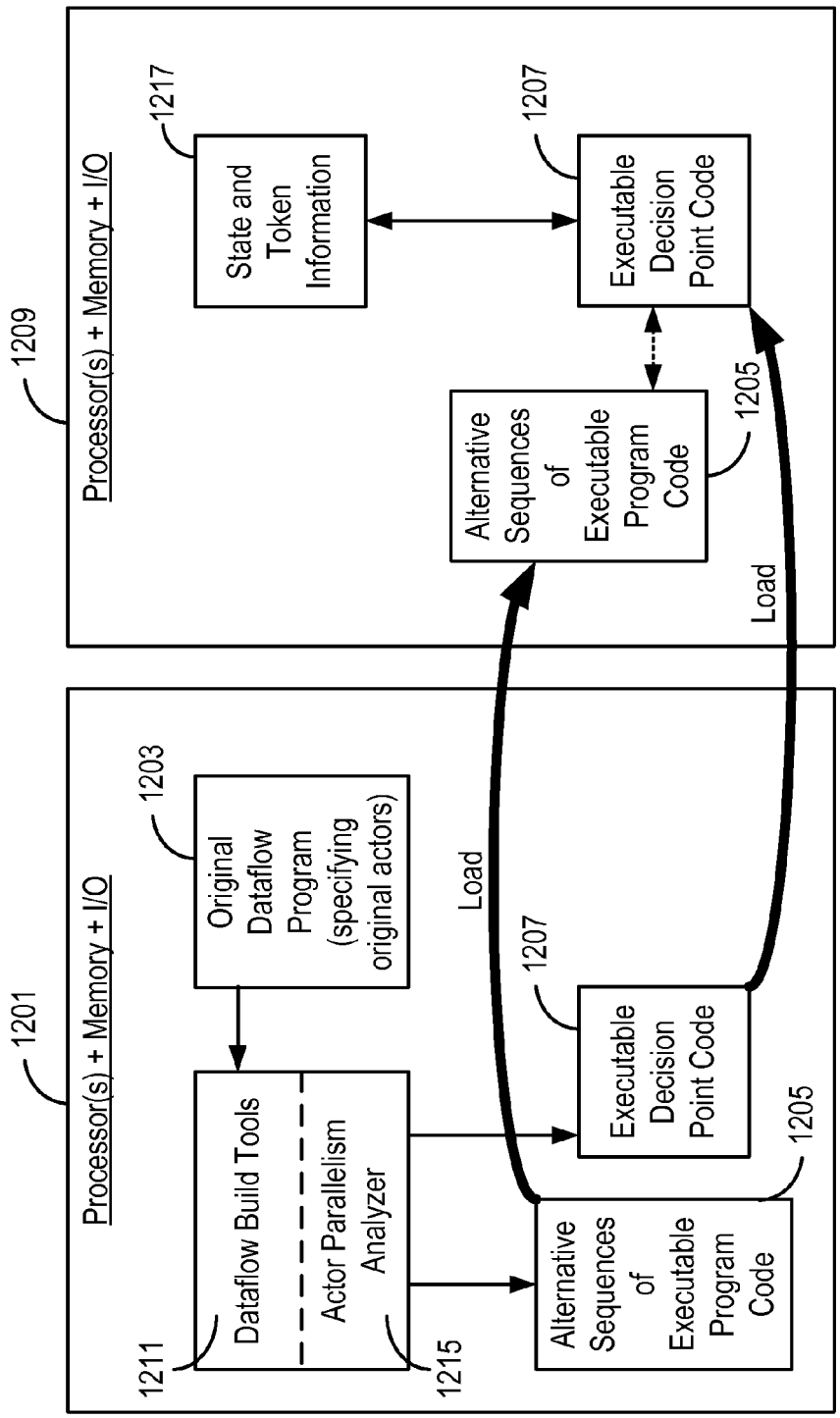
FIG. 12 is a block diagram showing another class of exemplary alternative embodiments of processing environments that include elements for enabling production and execution of a processed (reformulated) dataflow program having more parallelism than, and the same functionality as, actors in an original dataflow program.

FIG. 12 is a block diagram showing another class of exemplary alternative embodiments of processing environments that include elements for enabling production and execution of a processed (reformulated) dataflow program having more parallelism than, and the same functionality as, actors in an original dataflow program. The approach taken in this class of embodiments is to create and then run a set of executable dataflow program instructions in its normal runtime environment. The set of executable dataflow program instructions includes the sets of executable alternative action sequences. Concurrent with this execution is the execution of decision point instructions. The results (token and state information) from execution of any given one of the alternative sequences generated by the dataflow program execution are evaluated by the decision point code, which then selects the next alternative action sequence to be run.

In the general case, two processing environments, each including one or more processors, some sort of memory, and user Input/Output (I/O) devices, are utilized. It is contemplated that embodiments utilizing just one processing environment could also be created. A first processing environment 1201 is utilized to analyze the dataflow program 1203 and create therefrom executable program code 1205 and executable decision point code 1207 that can each be loaded into and executed by a second processing environment 1209. Creation of the executable program code 1205 and the executable decision point code 1207 is achieved by supplying a representation of the dataflow program 1203 to dataflow build tools 1211 (e.g., compiler, assembler, etc.), which includes an actor parallelism analyzer 1215. In this case, separate outputs (alternative sequences of executable program code 1205 and executable decision point code 1207) are generated and loaded into the second processing environment 1209.

It will be seen then, that in this class of embodiments, a dataflow program 1203 is a high level description of a method/program. This description is translated into machine code that is executed by the second processing environment 1209 (e.g., a device/computer). Generally, the dataflow program's executable machine code is made up of, for each of one or more actors, alternative sequences of executable program code. When running the decision point code 1207, the executable decision point code 1207 hosts the alternative sequences of executable program code 1205 in the same process context. Hence the executable alternative sequences of program code 1205 have access to the process memory and the program execution.

The executable decision point code 1207 has knowledge of symbols for methods of each action firing, each action selection, and sometimes token read/write events. This knowledge can be based on symbol character strings having a distinct convention in the compiler, e.g. "Actor_<actorname>_Action_<actionname>", with the "< ... >" being replaced with actual names of actors and actions. Alternatively the symbols are categorized separately (e.g., all action entries/exits are placed in a separate section (a general section for executable code exists but it is possible to have other sections). The decision point code also has knowledge of the data structures containing token FIFO buffers and actor states and their placement in memory because it can monitor the creation of those structures. In one embodiment the compiler generates code for a method that constructs the actor data structure and allocates it in memory. When the decision point code 1207 has knowledge of the symbol for the actor constructor and then detects that the constructor has allocated the actor state data structure, it can first save the allocated memory address and the size of the allocation. Alternatively, the data structure can be statically allocated and hence can be directly found by its symbol in the metadata.

The executable decision point code 1207 can then trap execution of these methods, either entering or leaving. A trap can be realized in several different ways, such as by replacing the first instruction in the method with a jump to debugger specific code, or by configuring the processor to issue an interrupt when execution reaches the memory address of the trapped method; this interrupt then initiates execution of decision point code methods. The decision point code 1207 will then, in the trap and based on what method was trapped, assess up-to-date values of token and state information 1217 to decide which of the executable alternative sequences to run next, and to then cause the selected executable alternative sequence to run.

Various aspects of embodiments consistent with the invention aim at increasing the level of parallelism that can be extracted from a dataflow program. A main approach to achieving this is reduction of serialization attributable to actors having a local state.

A resulting benefit is higher performance when a dataflow program is executed on parallel hardware. It is known that, given sufficient hardware resources (e.g., processor cores or Arithmetic Logic Units), the performance of a parallel program is limited by its serial bottleneck. In the context of dataflow programming, an actor that fires serially might constitute the bottleneck. Embodiments consistent with the invention incorporate means for eliminating or at least reducing such a bottleneck.

Hardware platforms in a wide variety of applications, such as but not limited to network equipment and mobile user equipment in, for example, telecommunications systems, are following a path towards massive parallelism, so the effort required to develop parallel software is a major concern. The various aspects described herein address this concern.

The invention has been described with reference to particular embodiments. However, it will be readily apparent to those skilled in the art that it is possible to embody the invention in specific forms other than those of the embodiment described above. Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of processing a dataflow program by a program development tool, wherein the dataflow program comprises one or more actors, each actor comprising one or more actions, the method comprising:
the program development tool causing processing equipment to perform:
retrieving stored dataflow program instructions from a memory;
analyzing an actor defined by the retrieved dataflow program instructions to identify one or more original sequences of one or more actions that are capable of being reformulated to achieve greater execution parallelism while maintaining a same functionality as the original sequences; and
producing, based on said analyzing, a processed dataflow program by producing processed dataflow program instructions and decision point program instructions,
wherein:
the processed dataflow program instructions comprise alternative sequences of reformulated actions that achieve greater execution parallelism while maintaining the same functionality as the identified one or more original sequences; and
the decision point program instructions are capable of causing the one or more processors to select and execute one or more of the alternative sequences of reformulated actions, wherein selecting the one or more of the alternative sequences of reformulated actions is performed at runtime of the processed dataflow program instructions and is based on state information of the one or more actors and token information about tokens passed between the one or more actors in existence at the time of selection.

2. The method of claim 1, wherein the decision point program instructions are logically configured to select, when two or more alternative sequences of reformulated actions are capable of being selected for execution, a preferred alternative sequence having a highest level of parallelism among the two or more alternative sequences.

3. The method of claim 1, wherein analyzing the actor defined by the retrieved dataflow program instructions to identify one or more original sequences of one or more actions that are capable of being reformulated to achieve greater execution parallelism while maintaining a same functionality as the original sequences comprises:
analyzing the actor defined by the retrieved dataflow program instructions to identify one or more original sequences that are capable of being reformulated by means of scalar renaming.

4. The method of claim 1, wherein analyzing the actor defined by the retrieved dataflow program instructions to identify one or more original sequences of one or more actions that are capable of being reformulated to achieve greater execution parallelism while maintaining a same functionality as the original sequences comprises:
analyzing the actor defined by the retrieved dataflow program instructions to identify one or more original sequences that are capable of being reformulated by means of induction variable substitution.

5. The method of claim 1, wherein analyzing the actor defined by the retrieved dataflow program instructions to identify one or more original sequences of one or more actions that are capable of being reformulated to achieve greater execution parallelism while maintaining a same functionality as the original sequences comprises:
analyzing the actor defined by the retrieved dataflow program instructions to identify one or more original sequences that are capable of being reformulated by means of idiom recognition.

6. The method of claim 1, wherein analyzing the actor defined by the retrieved dataflow program instructions to identify one or more original sequences of one or more actions that are capable of being reformulated to achieve greater execution parallelism while maintaining a same functionality as the original sequences comprises:
analyzing the actor defined by the retrieved dataflow program instructions to identify one or more original sequences that are capable of being reformulated by means of partitioning at least one of the one or more original sequences into mutually independent periods.

7. The method of claim 1, wherein:
one or more of the one or more original sequences updates an induction variable; and
the decision point program instructions are capable of causing the one or more processors to:
determine a final value of the induction variable from an original value of the induction variable without completing a first execution of any of the alternative sequences of reformulated actions; and
select and execute the one or more of the alternative sequences of reformulated actions based on the final value of the induction variable.

8. A program development tool for processing a dataflow program, wherein the dataflow program comprises one or more actors, each actor comprising one or more actions, the program development tool comprising:
circuitry configured to retrieve stored dataflow program instructions from a memory;
analyzing circuitry configured to analyze an actor defined by the retrieved dataflow program instructions to identify one or more original sequences of one or more actions that are capable of being reformulated to achieve greater execution parallelism while maintaining a same functionality as the original sequences; and
circuitry configured to produce, based on an analysis produced by the analyzing circuitry, a processed dataflow program by producing processed dataflow program instructions and decision point program instructions,
wherein:

the processed dataflow program instructions comprise alternative sequences of reformulated actions that achieve greater execution parallelism while maintaining the same functionality as the identified one or more original sequences; and the decision point program instructions are capable of causing the one or more processors to select and execute one or more of the alternative sequences of reformulated actions, wherein selecting the one or more of the alternative sequences of reformulated actions is performed at runtime of the processed dataflow program instructions and is based on state information of the one or more actors and token information about tokens passed between the one or more actors in existence at the time of selection.

9. The program development tool of claim 8, wherein the decision point program instructions are logically configured to select, when two or more alternative sequences of reformulated actions are capable of being selected for execution, a preferred alternative sequence having a highest level of parallelism among the two or more alternative sequences.

10. The program development tool of claim 8, wherein the analyzing circuitry comprises:

circuitry configured to analyze the actor defined by the retrieved dataflow program instructions to identify one or more original sequences that are capable of being reformulated by means of scalar renaming.

11. The program development tool of claim 8, wherein the analyzing circuitry comprises:

circuitry configured to analyze the actor defined by the retrieved dataflow program instructions to identify one or more original sequences that are capable of being reformulated by means of induction variable substitution.

12. The program development tool of claim 8, wherein the analyzing circuitry comprises:

analyzing the actor defined by the retrieved dataflow program instructions to identify one or more original sequences that are capable of being reformulated by means of idiom recognition.

13. The program development tool of claim 8, wherein the analyzing circuitry comprises:

circuitry configured to analyze the actor defined by the retrieved dataflow program instructions to identify one or more original sequences that are capable of being reformulated by means of partitioning at least one of the one or more original sequences into mutually independent periods.

14. The program development tool of claim 8, wherein:

one or more of the one or more original sequences updates an induction variable; and the decision point program instructions are capable of causing the one or more processors to:

determine a final value of the induction variable from an original value of the induction variable without completing a first execution of any of the alternative sequences of reformulated actions; and select and execute the one or more of the alternative sequences of reformulated actions based on the final value of the induction variable.

15. A non-transitory processor readable storage medium having stored therein program instructions that, when executed by processing equipment, cause the processing equipment to perform a method of processing a dataflow program, wherein the dataflow program comprises one or more actors, each actor comprising one or more actions, the method comprising:

retrieving stored dataflow program instructions from a memory;

analyzing an actor defined by the retrieved dataflow program instructions to identify one or more original sequences of one or more actions that are capable of being reformulated to achieve greater execution parallelism while maintaining a same functionality as the original sequences; and producing, based on said analyzing, a processed dataflow program by producing processed dataflow program instructions and decision point program instructions, wherein:

the processed dataflow program instructions comprise alternative sequences of reformulated actions that achieve greater execution parallelism while maintaining the same functionality as the identified one or more original sequences; and the decision point program instructions are capable of causing the one or more processors to select and execute one or more of the alternative sequences of reformulated actions, wherein selecting the one or more of the alternative sequences of reformulated actions is performed at runtime of the processed dataflow program instructions and is based on state information of the one or more actors and token information about tokens passed between the one or more actors in existence at the time of selection.

\* \* \* \* \*